United States Patent Office 3,748,296
Patented July 24, 1973

3,748,296
USE OF SULFONAMIDE DERIVATIVES HAVING OXYGEN-CONTAINING END GROUPS AS MODIFYING AGENTS AND/OR PIGMENT GRINDING AGENTS FOR THE MANUFACTURE OF MOLDED POLYURETHANE ARTICLES AND POLYURETHANE VARNISHES
Guenter Balbach, Weidach, and Guenther Reinert, Uhingen, Germany, assignors to Dr. Th. Bohme KG. Chem. Fabrik, Gartenberg, Germany
No Drawing. Filed Oct. 12, 1971, Ser. No. 187,899
Claims priority, application Germany, Oct. 10, 1970, P 20 49 802.6
Int. Cl. C08f 51/46
U.S. Cl. 260—308 R  9 Claims

ABSTRACT OF THE DISCLOSURE

A class of sulfonamide compounds are disclosed which have compatibility with polyurethane resins. The sulfonamides are useful as antistatic agents and plasticizers for polyurethane resins. These particular sulfonamide compounds are also useful as processing aids in the dyeing of polyurethane resins.

BACKGROUND OF THE INVENTION

The use of processing aids or modifying agents in plastics processing has always meant coming to terms with the problem of the compatibility of these auxiliary agents with the plastics material and the permanency of their effects in actual use. When using auxiliary agents in the processing of polyurethanes, care must therefore be taken that the desired properties of these plastics are retained if new possibilities arise in processing and use. Polyurethanes are presently used to a rapidly increasing extent, for instance, in the manufacture of artificial leather, because in addition to having extraordinarily good mechanical strengths they are largely resistant to solvents, thereby protecting them against destrucion through dry cleaning and on contact with benzine. Also, polyurethanes are flexible down to very low temperatures without the necessity of containing components extractible with water.

Thus far, no modifying agents are known which do not alter at least one of the advantageous properties of the polyurethanes described above. Hence, it has been necessary to manufacture a "custom-made" polyurethane for each use.

It can be readily appreciated that the plastics processing industry wishes to modify the commercially available polyurethanes to meet special requirements. One of the desired modifications is a permanent, i.e. extraction resistant, protection against electrostatic charges. Another desired modification is that of hardness or flexibility characteristics without loss of the advantages in the use of polyurethanes, described in the first paragraph above.

Also in the processing of polyurethanes suitable auxiliary agents can bring substantial advantages. Some of the processing problems which can be solved by the use of auxiliary agents are described hereinafter.

Often, plastics are pigmented during process in such a way that the required pigments are ground in a liquid which can be added to the plastics preparation without detriment to the processing characteristics and the utility value of the article made therefrom. Thus, the pigments for soft polyvinyl chloride (PVC) plastisols may be ground in plasticizers which are a part of the preparation anyway. Also, the pigments for varnishes can be ground in the solvent since solvent has to be evaporated upon application.

The grinding of the pigments promotes the uniform distribution in the plastics mass, at the same time agglomerates are divided by the high shearing stresses increasing the yield of the pigments and, furthermore, preventing pigment grains visible with the naked eye from appearing in the finished plastics article.

The grinding is usually achieved on grinding devices where high shearing forces are produced between a roller and a stationary doctor or between several rollers. If nonaqueous plastics dispersions are used, the pigments have to be ground in organic liquids. Either these liquids have to remain in the plastics mass or, if they might prejudice the properties, they have to be removed again.

The simplest means to remove them is by evaporation. Low-boiling substances are poorly suited for grinding on a roller since in the grinding process they are leveled out to form a very thin film resulting in considerable solvent losses due to the large surface area. On the other hand, it is hard to remove high-boiling substances by evaporation. Another method would be by way of extracting the pigment carrier liquid. This is, however, lengthy, complicated and, thus, expensive.

Therefore, it is advantageous to grind the pigments in high-boiling liquids that can remain in the plastics material without affecting it detrimentally, but which may even introduce quality improving effects.

Generally, organic liquids have a density close to 1. The conventional pigments, especially the inorganic ones, have substantially higher densities, e.g. chrome yellow: 6.12; titanium dioxide: 3.94–4.26; calcium carbonate: 2.72–2.93; iron oxide red: 5.25. As a result thereof, pigments even if finely divided have the tendency to settle out, which may also appear as separation of the organic liquid at the surface in the case of high pigment concentration. The rate at which this phenomenon occurs is dependent upon the viscosity of the organic liquid, it should, however, be always expected with high density differentials.

A high-boiling organic liquid with good pigment carrier characteristics, which is well compatible with polyurethane solutions and the molded articles made therefrom and which does not reduce the advantages arising from the use of polyurethanes as described above must constitute a valuable aid for the producer.

OBJECTS OF THE PRESENT INVENTION

It is an object of the present invention to provide a group of sulfonamide derivatives which are modifying and processing agents for and compatible with polyurethane resins.

It is another object of the present invention to define a group of sulfonamide derivatives which are useful as antistatic agents and plasticizer for polyurethane resins.

It is yet another object of the present invention to provide sulfonamide derivatives suitable for use as stable solvent media for pigments in the dyeing of polyurethane resins.

It is yet still another object of the instant invention to provide a resin composition comprising polyurethane and sulfonamide derivatives.

BRIEF SUMMARY OF THE INVENTION

These and other objects arise out of the fact that, using the sulfonamide derivatives described in more detail below, pigment suspensions or triturations can be produced which are stable for months, that in concentrations of 0.5% by weight and higher based on the weight of polyurethane, they impart to the molded articles made therefrom a markedly reduced tendency towards electrostatic charging to the molded articles made therefrom, and that in concentrations of approximately 10% by weight and up to 30%, based on the weight of the polyurethane, they exert an increasing plasticizing effect with increasing concentration. Also, up to 30% by weight they are fully compatible with polyurethanes, including commercial polyurethanes, and resistant to extraction by water, benzine, mineral oil and halogenated hydrocarbons. Therefore, within the purview of the present resin composition, the sulfonamide can be present in an amount of from about 0.5 to 30 weight percent based on the polyurethane.

It was extremely surprising that it was possible to realize both the desired modifications of the properties of polyurethanes and the described advantages in their processing with a *single* class of compounds without decreasing the numerous advantages of the polyurethanes as materials. The benefits to the plastics processor if he has to buy and store only one product are evident. Moreover, it is sufficiently known from plastics processing that if several auxiliary agents are used, it is not only necessary to bear in mind the interaction between plastics material and auxiliary agent, but also the reciprocal influence of these auxiliary agents.

DETAILED DESCRIPTION AND EXAMPLES OF THE INVENTION

For use within the scope of the present invention are suitable sulfonamides having the general formula

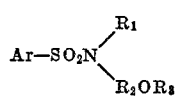

wherein Ar represents an aromatic radical, $R_1$=H or an alkyl radical having from 1 to 3 carbon atoms, $R_2$=alkylene radical having from 1 to 5 carbon atoms, and $R_3$=H, an alkyl radical having from 1 to 3 carbon atoms, or an acyl radical. As aromatic radical Ar the benzene ring is preferred because nucleus-substituted or polynuclear aromatics form crystalline sulfonamides which are generally unsuitable for grinding pigments in the coloring of polyurethanes.

While it is true that there are references to chemically similar substances to be found in the literature, the subject matter of the present invention is not taught.

In Thinius, Kunststoff 38, pp. 108-110 (1948) there is described that substances containing hydroxyl groups are suitable for plasticizing polymers containing amido and urethane groups. Furthermore, there is an indication to the possibility of using sulfonamides as plasticizers. However, the combination of the two chemical groupings and the special advantages of this very combination are not described.

Sulfonamides containing hydroxyl groups are set forth in the French Pat. 963,315, but this patent relates to water-soluble substances to modify rayon. In the U.S. Pat. 2,855,375 hydroxyl groups containing sulfonamides are described as processing aids in vinylidene cyanide copolymers. Their compatibility is mentioned as sole argument in favor of their utilization. Resistance to chlorinated hydrocarbons is neither required, nor has this special advantage been recognized. The German "Auselgeschrift" 1,155,118 describes a method for producing special sulfonamides. The specification contains a general indication to the usability as plasticizer, the same also applies to the German Pats. 753,345 and 935,433. Also in David Aelony, Ind. Engng. Chem. 46, pp. 587-91 (1954), in addition to the producing of hydroxyl-containing sulfonamides, only their effect on the mechanical properties of polyvinyl chloride is investigated.

The Examples here below shall illustrate the advantages arising from the utilization of the substances according to the invention in the processing of polyurethanes, i.e. the obtaining of antistatic varnish coats and molded articles, the modification of the hardness of polyurethanes and the possibility of making stable pigment pastes, without prejudice to the properties of the films upon exposure to water, benzine, mineral oil and halogenated hydrocarbons.

Example 1

To a polyurethane solution, which is marketed under the name of Quinn QL5041, which is a tetrahydrofuran solution of polyester-polyurethane, N-β-hydroxypropyl-benzene sulfonamide is added in such a way that 2 g. of sulfonamide are present for 100 g. of polyurethane. The stress-strain curve of a film of this varnish does not differ from the stress-strain curve of an unmodified varnish. If a film of unmodified varnish on a non-conducting support is rubbed vigorously 10 times in one direction with a polyamide fabric, such as nylon which of course must not have been treated antistatically, if the film is now lifted off the support and held over fresh (dry) cigarette ash, the latter is strongly attracted. The same test carried out with the modified varnish does not show any charge.

Using samples of 100 mm. length and 20 mm. width, measurements of the surface resistance of conventional means yield the following values in ohms at 20° C. and 50% relative humidity:

| Modified: | Unmodified: |
|---|---|
| $1.8–10^{11}\Omega$ | $1.0–10^{12}\Omega$ |

Example 2

A solution of a polyurethane marketed under the designation Estane 5707 which is a polyesterpolyurethane dissolved in dimethylformamide is mixed with different quantities of N-γ-methoxypropyl-benzene sulfonic acid amide: For films of 0.095 mm. thickness and 15 mm. width made from these solutions the force necessary for an elongation to determine shear of 12.5% was determined.

| Plasticiser content (percent): | Force (kp.) |
|---|---|
| 0 | 6.90 |
| 10 | 4.20 |
| 20 | 3.00 |
| 30 | 3.00 |

Example 3

The same polyetherurethane solution as in Example 2 was mixed with different quantities of N-β-hydroxylethyl-benzene sulfonamide and measured as in Example 2.

The films were then washed at 40° C. in a bath ratio of 1:300 with 2 g./l. of the household detergent "Perwoll," dried and then measured.

Finally, the films were cleaned four times one after the other in the following bath:

320 g. of perchloroethylene
1 g. of a commercial cleansing activator
0.8 g. of water
bath ratio 1:100

Measurement was as in Example 2.

| Plasticiser content, percent | Untreated film (kp.) | Washed film (kp.) | Cleaned film (kp.) |
|---|---|---|---|
| 0 | 7.50 | 7.27 | 7.14 |
| 10 | 4.75 | 4.40 | 5.23 |
| 20 | 4.15 | 4.50 | 3.90 |
| 30 | 3.44 | 4.05 | 3.90 |

The measured values prove the extraction-resistance of the plasticising effect.

Example 4

A polyurethane film commercially available under the designation Estane 5714 was stored at 90° C. for 24 hrs. with 30% by wt. of N-β-hydroxypropyl-benzene sulfonamide based on the weight of the film. Compared to a non-plasticised film, the film had not become more sticky. No exuded plasticiser could be found on examining the film with the naked eye and pressing on of tissue paper.

Example 5

A film of a solution of Estane 5707 was compressed at 4 g./cm.$^2$ with a second film of this polyurethane, which contained 30% of N-β-hydroxypropyl-benzene sulfonamide, at 4 g./cm.$^2$ and stored at 90° C. for 24 hrs. As a result, the films were not glued together.

Example 6

A film of Quinn QL5041 containing 20% of N-(β-acetylethyl)-benzene sulfonamide was subjected to an impact test at −35° C. in comparison with a non-plasticised film. No embrittlement was found.

Example 7

Chrome yellow was made into a paste with N-β-hydroxy-ethyl-benzene sulfonamide and ground on a three-roller arrangement (laboratory device of the firm of Drais). The weight ratio of pigment sulfonamide was 1:1. Following storage for more than 6 months the trituration did not show any signs of demixing. 5 parts of the above described pigment product were stirred into 100 parts of a 20% solution of the polyether-polyurethane Estane 5714 in dimethylformamide. A varnish film produced therefrom showed a flawless yellow coloration.

While the aforementioned examples have been carried out using N-β-hydroxypropylbenzene sulfonamide, N-γ-methoxypropyl-benzene sulfonamide, and N-β-hydroxyethylbenzene sulfonamide, other sulfonamides such as N-β-acetoxypropylbenzenesulfonamide, N-γ-methoxyethylbenzenesulfonamide, and N,N-methylhydroxyethylbenzenesulfonamide.

The stress-strain curves mentioned in Example 1 were obtained by means of a "Textechno Statigraph N" built by Textechno Herbert Stein, Nönchengladbach, West Germany, Regentenstrasse 37/39.

What is claimed is:

1. A composition of matter comprising:
   (a) a polyurethane resin; and
   (b) a sulfonamide having the general formula

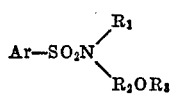

wherein:
Ar is phenyl,
R$_1$ is hydrogen, an alkyl radical having from about 1 to 3 carbon atoms,
R$_2$ is an alkyl radical having from about 1 to 5 carbon atoms, and
R$_3$ is hydrogen, an alkyl radical having from 1 to 3 carbon atoms, or an acyl radical having from about 1 to 4 carbon atoms.

2. The composition of matter of claim 1 wherein the sulfonamide compound is present in a weight ratio of from about 0.5 to 30 percent based on the weight of the polyurethane resin.

3. The composition of claim 1 wherein the sulfonamide compound is present in a weight ratio of from about 10 to 30 percent based on the weight of the polyurethane resin.

4. The composition of claim 1 wherein the Ar radical is benzene.

5. The composition of claim 1 wherein the sulfonamide is selected from the group consisting essentially of N-β-hydroxypropyl-benzene sulfonamide, N-γ-methoxypropyl-benzene sulfonamide, and N-β-hydroxyethyl-benzene sulfonamide.

6. In the processing of polyurethane resin to modify its characteristics, the addition to polyurethane resin of sulfonamide compounds having the general formula

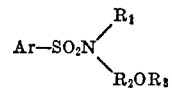

wherein:
Ar is phenyl,
R$_1$ is hydrogen or an alkyl radical having from 1 to 3 carbon atoms,
R$_2$ is an alkyl radical having from 1 to 5 carbon atoms, and
R$_3$ is hydrogen, alkyl radical having from 1 to 3 carbon atoms, or an acyl radical having from 1 to 4 carbon atoms.

7. The process of claim 6 wherein the amount of sulfonamide added to the resin is from about 0.5 to 30 weight percent based on the polyurethane.

8. The process of claim 6 wherein the amount of sulfonamide added to the resin is from about 10 to 30 weight percent based on the polyurethane.

9. The process of claim 6 wherein the sulfonamide is selected from the group consisting essentially of N-β-hydroxypropyl - benzene sulfonamide, N-γ-methoxypropyl-benzene sulfonamide, N-β-hydroxyethyl-benzene sulfonamide.

References Cited

UNITED STATES PATENTS

| | | | |
|---|---|---|---|
| 3,542,704 | 11/1970 | Radcliffe | 260—2.5 |
| 2,855,375 | 10/1958 | Doboy | 260—30.8 |
| 3,533,980 | 10/1970 | Minuto | 260—30.8 |
| 3,242,125 | 4/1966 | Walker | 260—30.8 |

OTHER REFERENCES

K. Thinius: Kunststoff, vol. 38, pp. 108–110, 1948, USPQ Chem. Library.

MORRIS LIEBMAN, Primary Examiner

R. ZAITLEN, Assistant Examiner

U.S. Cl. X.R.

260—556 AR

UNITED STATES PATENT OFFICE
CERTIFICATE OF CORRECTION

Patent No. 3,748,296          Dated July 24, 1973

Inventor(s) Guenter Balbach, et al.

It is certified that error appears in the above-identified patent and that said Letters Patent are hereby corrected as shown below:

Column 5, line 43 "Nönchengladbach" should be

-- Mönchengladbach --.

Signed and sealed this 26th day of February 1974.

(SEAL)
Attest:

EDWARD M. FLETCHER, JR.         C. MARSHALL DANN
Attesting Officer               Commissioner of Patents